United States Patent
Assmann et al.

[11] Patent Number: 5,803,621
[45] Date of Patent: Sep. 8, 1998

[54] AXIAL ROLLER BEARING ASSEMBLY

[75] Inventors: Joerg Assmann; Klaus Kispert, both of Schweinfurt, Germany

[73] Assignee: SKF GmbH, Germany

[21] Appl. No.: 782,529

[22] Filed: Jan. 10, 1997

[30] Foreign Application Priority Data

Jan. 17, 1996 [DE] Germany .......... 29600704 U

[51] Int. Cl.[6] .......... F16C 19/30; F16C 33/76
[52] U.S. Cl. .......... 384/620; 384/607; 384/614
[58] Field of Search .......... 384/590, 607, 384/614, 617, 618, 620, 621, 622, 623, 448

[56] References Cited

U.S. PATENT DOCUMENTS

| | | | |
|---|---|---|---|
| 449,965 | 4/1891 | Simonds | 384/614 X |
| 1,994,996 | 3/1935 | Horrocks | 384/622 X |
| 2,809,049 | 10/1957 | Carlson | 384/617 X |
| 3,380,790 | 4/1968 | Osmond | 384/618 |
| 3,433,543 | 3/1969 | Eck | 384/621 |
| 3,519,317 | 7/1970 | Spence et al. | 384/614 |
| 4,976,551 | 12/1990 | Scharting et al. | 384/448 |
| 5,232,290 | 8/1993 | Buschle et al. | 384/620 X |

FOREIGN PATENT DOCUMENTS

| | | | |
|---|---|---|---|
| 92 14 393 U | 10/1992 | Germany . | |
| 5-272529 | 10/1993 | Japan | 384/623 |

*Primary Examiner*—Thomas R. Hannon
*Attorney, Agent, or Firm*—Eugene E. Renz, Jr. PC

[57] ABSTRACT

Axial roller bearing assembly for absorbing the axial forces of a steering knuckle pivotally supported on a steering knuckle bolt at the end of an axle of a vehicle comprising first and second bearing disks having spaced confronting raceways for a plurality of rolling elements. One of the disks has a sleeve-like edge, which encloses the rolling elements and the lateral surface of the second disk with play and prevents the rolling elements from escaping radially outwardly. A sealing ring made of elastic-type material is disposed between the sleeve-like edge and the lateral surface. A stop ring (27), separate from the disks (13, 16), is provided on the inner radial envelope circle of the rolling elements (15) to prevent the rolling elements (15) from escaping radially inwardly.

7 Claims, 2 Drawing Sheets

AXIAL ROLLER BEARING ASSEMBLY

FIELD OF THE INVENTION

The present invention relates to axial roller bearing assemblies. More specifically, the invention relates to bearing of this type used to absorb the axial forces of a steering knuckle, which are mounted in a manner to pivot around a steering knuckle bolt at one end of a vehicle axle, wherein one of the bearing disks has a sleeve-like edge, which encloses the rolling elements and wherein the lateral surface of the second bearing disk is mounted with play to prevent the roller elements from escaping radially outward, and including a sealing ring of elastic plastic between the edge and the lateral surface.

BACKGROUND OF THE INVENTION

Axial roller bearings per se are not new. German Utility Model No. 92 14 393 shows an axial roller bearing generally the type described above. In accordance with the axial cylindrical roller bearing shown in this patent, one of the bearing disks is provided not only with the outer, ring-shaped edge, which encloses the rolling elements, but also with an integral radially inwardly-situated edge or flange, which holds the rolling elements in the radial direction. It has been found that when both edges are designed integral with the bearing disk, the machining of the associated raceway and the guide surfaces for the rolling elements, which must, for functional reasons, be ground, presents production difficulties and therefore is rather costly to manufacture and cannot be manufactured economically.

SUMMARY OF THE INVENTION

When the foregoing in mind, it is an object of the present invention to provide an axial roller bearing of the type described above which is characterized by novel features of construction and arrangement so that it can be produced more easily and, therefore, is much more economical. To this end, a stop ring designed separately from the bearing disks is provided on the radially inwardly located envelope circle of the rolling element, which functions to prevent the roller elements from escaping radially inwardly. By the reason of the stop-ring arrangement, the radially inward edge or flange on the bearing disk can be omitted. This, in turn, facilitates machining the raceway or the guide surface very easily and in particular, can be easily ground. Furthermore, the bearing ring is now provided merely with a single edge or flange, which can be easily prefabricated as a cup by suitable processing including pressing or deep-drawing. As a result, considerable cost savings are achieved, particularly when the lots are small. In accordance with the arrangement of the present invention, the rolling elements are held radially in position by the integral edge of the bearing disk and the stop ring, and are thus prevented from falling out of the roller bearing.

In accordance with another feature of the present invention, the stop ring which is designed to hold the rolling elements in the radial direction in the raceway during transport and assembly of the bearing, can be either closed or opened, that is slotted, at a predetermined point about its periphery. The slotted arrangement provides the advantage that the stop ring can be made of a flat strip and then bent into an annular or ring-like shape. This means that this part can be mass produced at low cost. It also provides the advantage that the rolling elements can be pressed elastically in the radial direction against the remaining edge of the bearing disk.

The stop ring is preferably made out of metal, that is sheet metal. However, in accordance with another feature of the invention, it may be made of plastic or other inexpensive materials which can be processed at low cost.

In accordance with another feature of the present invention, the axial height of the stop ring is preferably made smaller than the axial distance between the confronting surfaces of the bearing rings, so that lubricant can be introduced into the interior space of the bearing if needed.

In accordance with still another feature of the present invention, a sealing ring can be provided having at least two angularly disposed sealing lips, wherein at least one of the lips rests against the bore surface of the sleeve-like edge or against the lateral surface of the second bearing disk, while the other lip projects beyond the outer end surface of the second bearing disk. The advantages of the feature described above is that the axial play between the eye of the fork of the steering knuckle and the stub of the vehicle axle does not impair or break the seal of the bearing. This is particularly important since steering knuckles are used in environments where they are exposed during operation to contaminates such as dirt, water, particularly saltwater, and other aggressive media. It has been found one sealing ring alone is enough to ensure reliable sealing action between the bearing disks as they articulate relative to one another and between the fork eye and the bearing disk which moves axially with respect to the eye. The configuration of the present invention obviates the need for narrow precise production tolerances in the seal area without compromising the effectiveness and quality of the seal.

In accordance with another feature of the present invention, the axial roller bearing assembly can be protected from corrosion by providing at least the surfaces exposed to the ambient environment with a protective coating which can consist of any well known corrosion-proofing agent.

BRIEF DESCRIPTION OF THE DRAWINGS

These and other objects of the present invention and various features and details of the operation and construction thereof are hereinafter more fully set forth with reference to the accompanying drawings, wherein.

DETAILED DESCRIPTION OF THE PREFERRED EMBODIMENT

Figure 1:
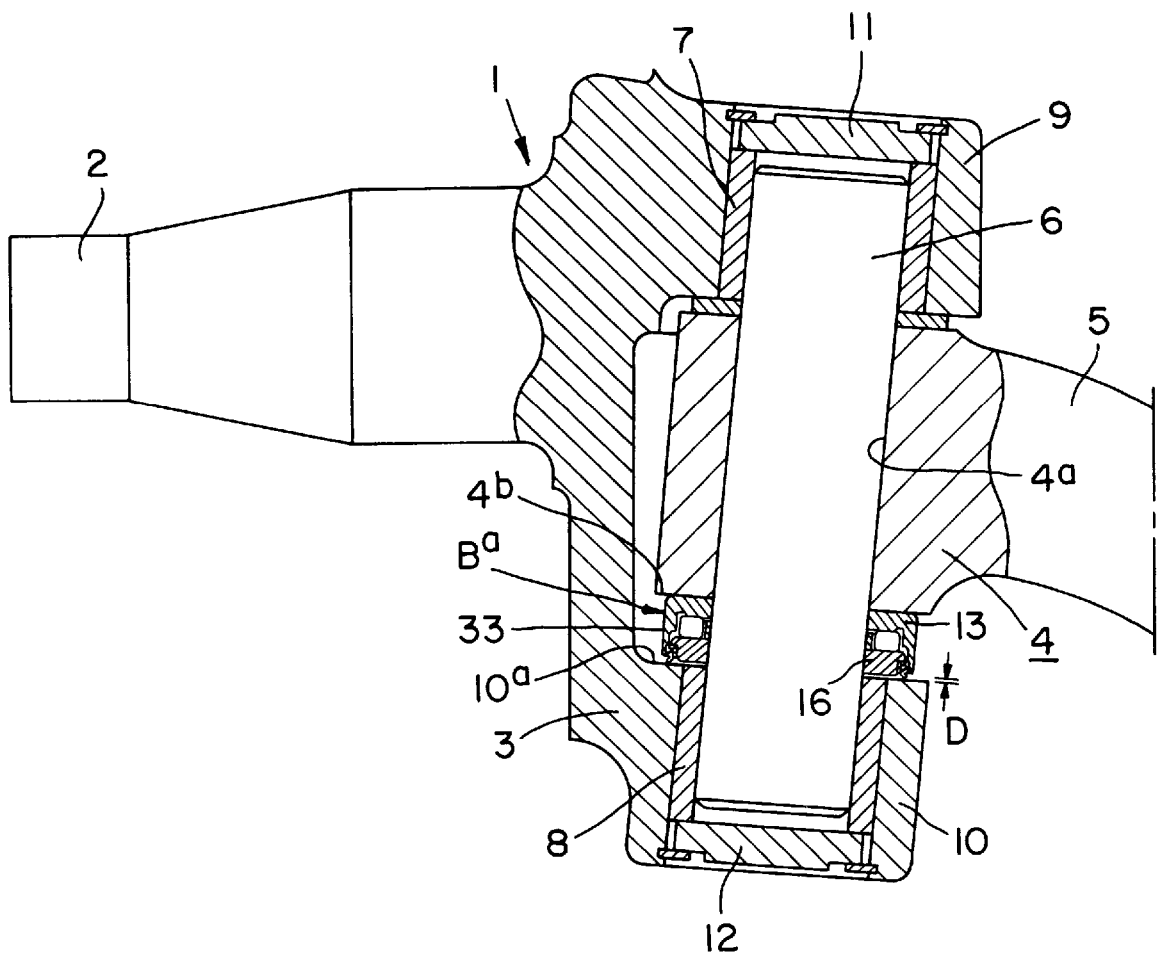
FIG. 1 is a cross-sectional view of a steering knuckle support assembly.

Referring now to the drawings and particularly to FIG. 1 thereof, there is shown a steering knuckle assembly of generally conventional configuration comprising a steering knuckle (1) having a axle stub (2) to support a wheel bearing (not shown) and a fork-shaped end (3). One terminal end of a vehicle axle (5) is expanded to form a bearing stub (4), located between the upper and lower eyes (9, 10) of the fork (3). A steering knuckle bolt (6) extends through bore ($4_a$) of bearing stub (4) and is journaled at its opposing terminal ends in bearing bushings (7, 8) supported in the upper and lower fork eyes (9, 10). The bores in fork eyes (9, 10) are closed off in each case toward the outside by covers (11, 12).

Figure 2:
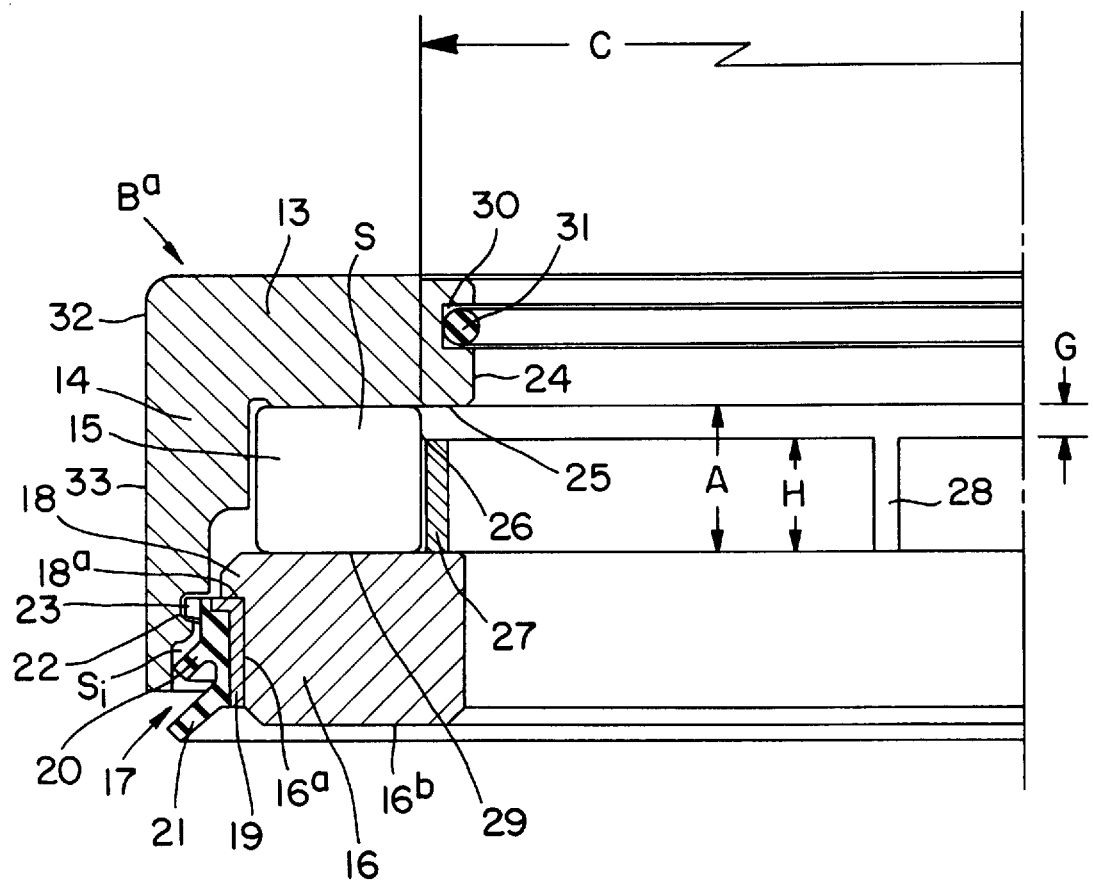
FIG. 2 is a partial view of the axial roller bearing of the steering knuckle support assembly of FIG. 1.

An axial roller bearing assembly generally designated $B_a$ in the present instance is thrust bearing mounted between the lower axial end face $4_b$ of bearing stub (4) and the inner axial end face ($10_a$) of fork eye (10). Details of the axial bearing $B_a$ are shown in an enlarged scale in FIG. 2. As best illustrated in FIG. 2, the bearing assembly comprises an upper bearing disk (13) of cup shaped configuration having a depending generally cylindrical sleeve (14) and a lower bearing disk (16). The bearing disks (13, 16) have confronting upper and lower circumferentially extending raceways (25, 29, respectively) which are spaced apart to define an annular space (S) for a plurality of roller elements, in the present instance rollers (15). The upper bearing disk (13) is of generally cup-like shape having a depending circumferentially extending sleeve-like extension (14) which encloses as illustrated, the annular space (S) for the rolling elements and overlies the outer peripheral surface ($16_a$) of the lower bearing disks (16) to a point slightly above the lower axial end surface ($16_b$) thereof. A sealing ring (17) is mounted in the intermediate space $S_i$ between the cylindrical sleeve (14) and lower bearing disk (16) which, as illustrated in FIG. 2, is mounted on the outer peripheral surface ($16d$) of the lower bearing disk (16). A ring-shaped collar (18), in the present instance, formed integrally at the upper end of the bearing disk (16) defines a circumferentially extending shoulder ($18_a$) providing an axial stop for the sealing ring (17).

Sealing ring (17) is preferably made of an elastic material, such as plastic and is armored with a reinforcing metal ring (19) and has two sealing lips (20, 21). Sealing lip (20) rests against the bore surface of sleeve-shaped edge (14) to form a seal. The second sealing lip (21) projects beyond the outer end surface ($16_a$) of the lower bearing disk (16) in the axial direction. The two sealing lips (20, 21) are arranged on the sealing element at a downward and outwardly-slanting angle as a result of which they offer the desired type of elastic resilience.

The bore surface of the sleeve-like edge (14) also has a ring-shaped groove (22), into which a bead 23 on the periphery of sealing ring (17) fits. Upper bearing disk (13) is designed at its radially inward end (24) without any limiting part projecting axially beyond raceway (25). To prevent cylindrical rollers (15) from falling out in the radially inward direction, a loose, that is, separate, stop ring (27) is provided on the radially inward envelope circle (C), that is, on the circle described by the inner end surfaces of the rollers. This stop ring (27) is slotted at a certain point (28) on its periphery and rests elastically against the radially inward end surfaces (26) of the rollers. The axial height (H) of stop ring (27) is preferably smaller than axial distance A between raceway (25) of bearing disk (13) and raceway (29) of bearing disk (16). As a result, a gap (G) is created, so that, if desired, lubricant can enter the interior space of the bearing, for example, when the bearing is re-lubricated from the inside.

As shown in FIG. 2, the individual parts of the axial roller bearing are held together as a structural unit by a bead (23), which engages in ring-shaped groove (22), and by stop ring (27), which means that the bearing can be preassembled with the help of the sealing ring. Radial grooves are provided in bead (23) in order that the lubricant can escape for example when the bearing is re-lubricated. A ring-shaped groove (30), in which an O-ring (31) is inserted, is also provided in the bore extending through upper bearing disk (13).

In the assembled state of FIG. 1, upper bearing disk (13) is held elastically in place on steering knuckle bolt (6) by O-ring (31). At the same time, lubricant is prevented form escaping in the upward direction. Lower bearing disk (16) is seated on the end surface ($10_a$) of lower fork eye (10), for which reason axially oriented sealing lip (21) rests with pretension on the end surface ($10_a$) of the fork eye. During operation, lower bearing disk (16) is lifted from fork eye (10) in the axial direction by a predetermined distance (D) corresponding to that normally occurring in practice, sealing lip (21) remains resting on end surface of fork eye (10) because of its elastic pretension, so that the sealing effect remains preserved.

Lateral surface (32) of upper bearing disk (13) is coated with a corrosion-proofing layer (33) (32 is not shown), so that media such as saltwater, acting on the bearing cannot cause any damage.

Even though a particular embodiment of the invention has been illustrated and described herein, it is not intended to limit the invention and changes and modifications may be made therein within the scope of the following claims.

What is claimed is:

1. An axial roller bearing assembly comprising a first bearing disk (13) having a generally cylindrical sleeve (14) formed integrally with said first bearing disk (13) and projecting from an outer peripheral edge of said first disk (13), a second bearing disk (16), said bearing disks (13, 16) having confronting, circumferentially extended spaced raceways (25, 29) and a plurality of rolling elements (15) in the annular space (S) between the raceways (25, 29), means detachably mounting said second bearing disk (16) interiorly of said sleeve (14) whereby the rollers are contained from escaping radially outwardly, a circumferentially extending sealing ring (17) mounted between the sleeve (14) and second disk (16) and a stop ring (27) elastically engaging the inner axial radial envelope of the rolling elements (15) to prevent escape of the rolling elements (15) radially inwardly.

2. Axial roller bearing according to claim 1, characterized in that the stop ring (27) is open, that is, slotted, at a certain point (28) on its periphery.

3. Axial roller bearing according to claim 1, characterized in that the stop ring (27) is made of plastic.

4. Axial roller bearing according to claim 1, characterized in that the axial height (H) of the stop ring (27) is smaller than the axial distance (A) between the facing surfaces (25, 29) of the bearing disks (13, 16).

5. Axial roller bearing according to claim 1, characterized in that the sealing ring (17) has at least two sealing lips (20, 21) pointing away from it at an angle, at least (20) one of which rests against the bore surface of the sleeve-shaped edge (14) or against the lateral surface of the second bearing disk (16), and where at least one other lip (21) projects beyond the outer end surface ($16_b$) of the second bearing disk (16).

6. Axial roller bearing according to claim 1, characterized in that at least the surfaces (32) exposed to the outside are provided with a protective coating (33).

7. Axial roller bearing assembly for absorbing the axial forces of a steering knuckle pivotally supported on a steering knuckle bolt at the end of an axle of a vehicle comprising first and second bearing disks having spaced confronting raceways for a plurality of rolling elements, one of said disks having a sleeve-like edge, which encloses the rolling elements and the lateral surface of the second disk with play and prevents the rolling elements from escaping radially outwardly and a sealing ring made of elastic-type material between the bore surface of said sleeve like edge and the lateral surface, characterized in that a stop ring (27), separate from the disks (13, 16), is provided on the inner radial envelope circle of the rolling elements (15) which by pressing elastically against said circle thereby prevents the rolling elements (15) from escaping radially inwardly, at least the surfaces (32) exposed to the outside being provided with a protective coating (33).

* * * * *